United States Patent
Schellenberg

(10) Patent No.: US 6,805,389 B1
(45) Date of Patent: Oct. 19, 2004

(54) MOTOR VEHICLE RADIATOR SHIELD

(76) Inventor: Abram Schellenberg, Rte. 1, Box 105, Omega, OK (US) 73764

(*) Notice: Subject to any disclaimer, the term of this patent is extended or adjusted under 35 U.S.C. 154(b) by 0 days.

(21) Appl. No.: 10/669,773

(22) Filed: Sep. 24, 2003

(51) Int. Cl.$^7$ .............................................. B60R 19/52
(52) U.S. Cl. ..................................................... 293/115
(58) Field of Search ....................... 293/115; 296/193.1, 296/29

(56) References Cited

U.S. PATENT DOCUMENTS

| | | | |
|---|---|---|---|
| 3,282,368 A | * 11/1966 | Pittera | 293/115 |
| 3,762,489 A | * 10/1973 | Proksch et al. | 180/68.1 |
| 3,788,419 A | * 1/1974 | Drone et al. | 180/68.4 |
| 4,406,489 A | * 9/1983 | Trabert | 293/115 |

* cited by examiner

Primary Examiner—Jason Morrow
(74) Attorney, Agent, or Firm—Frank J. Catalano

(57) ABSTRACT

A shield for protecting a radiator mounted behind the front grille of a motor vehicle has a grating vertically disposed between the grille and the radiator. The grating has a matrix of quadrangular opening tapering from front to rear in the shape of a truncated pyramid. The increasing of open area in the front face of the grating and the tapered walls of the openings maximize the rate of flow of air to the radiator. The small openings on the rear face of the grating reduce the possibility of stones and debris passing through the grating to the radiator. The grating is mounted by use of mating clips and buttons attached to the vehicle frame and to the grating so that the grating can be easily removed for cleaning or replacement.

20 Claims, 3 Drawing Sheets

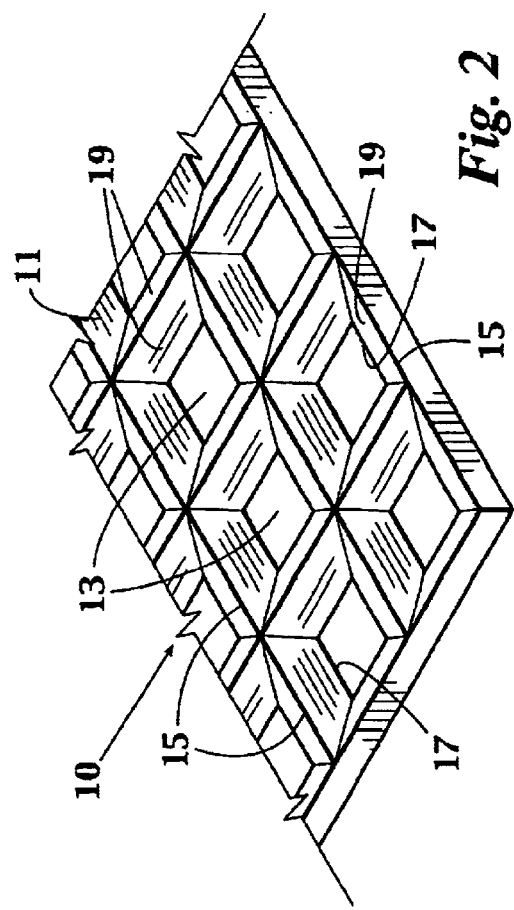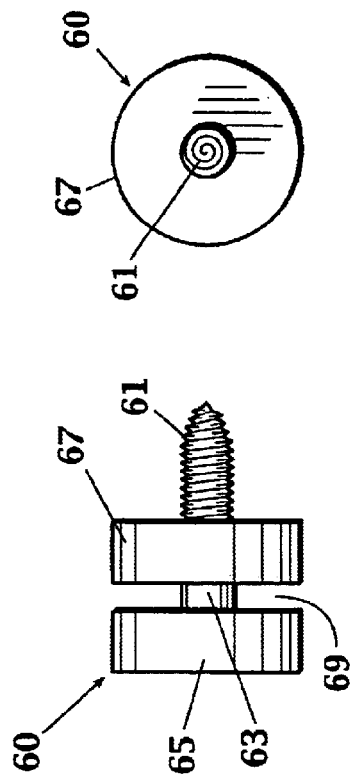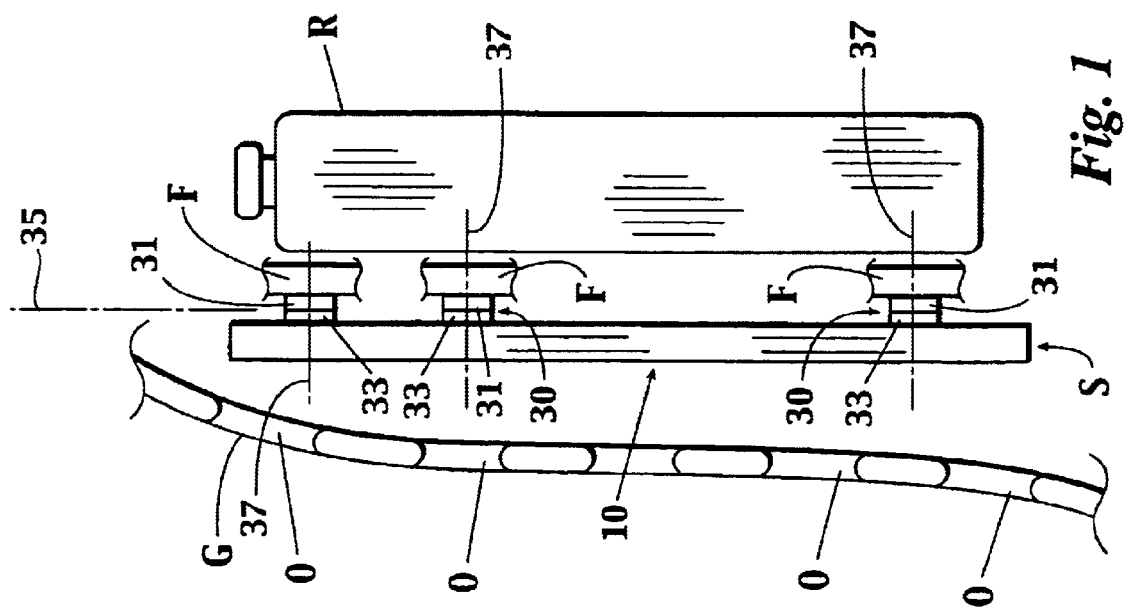

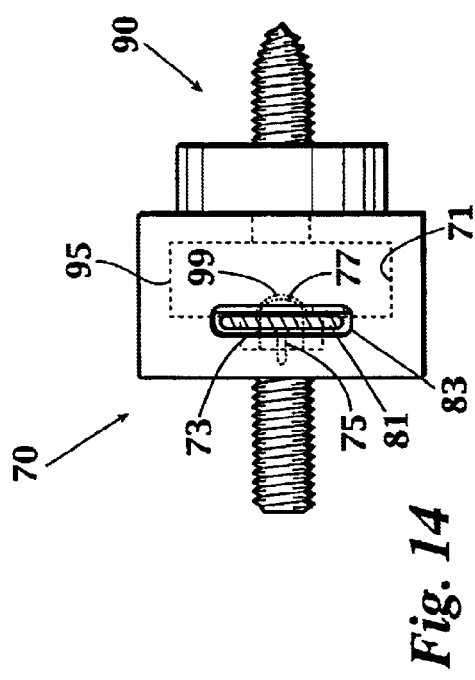
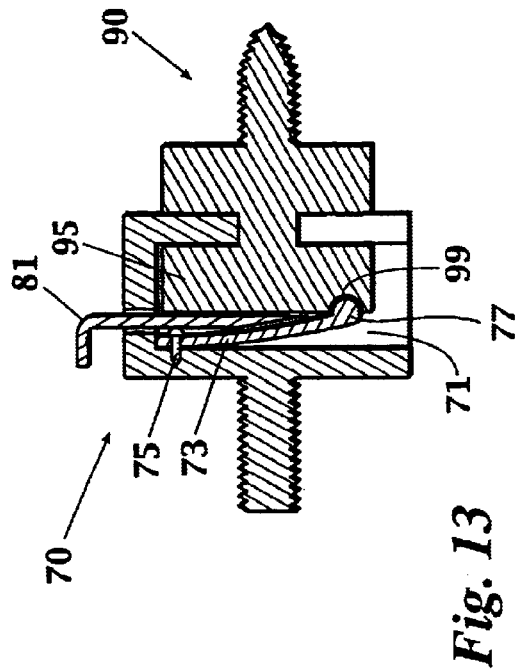
Fig. 14
Fig. 13
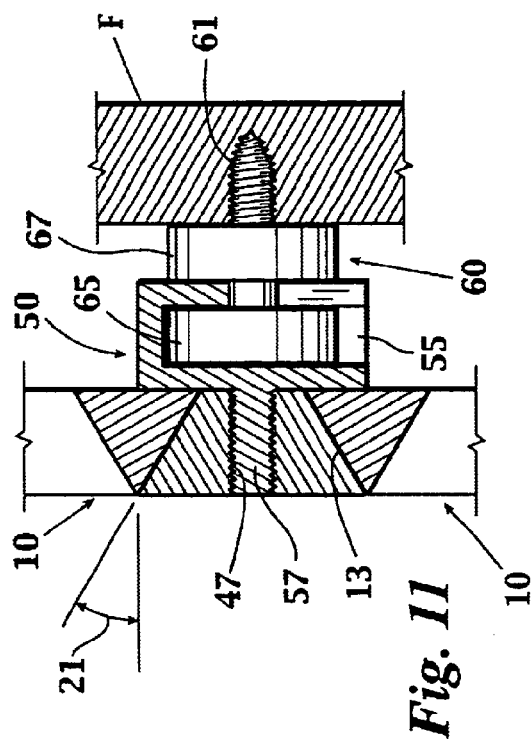
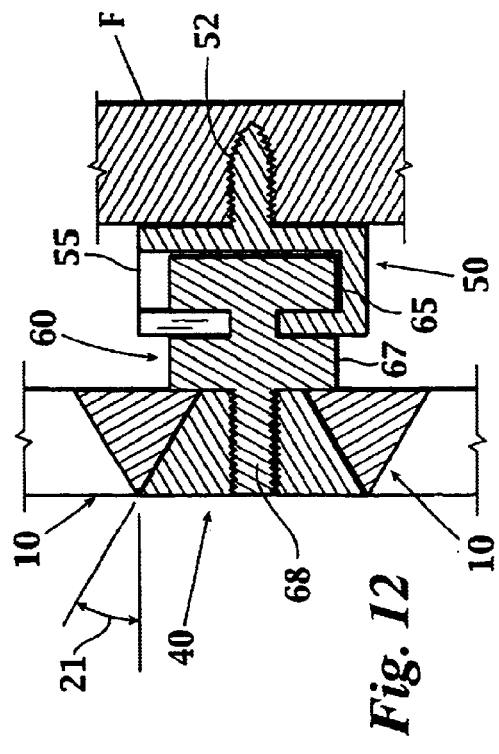
Fig. 11
Fig. 12

MOTOR VEHICLE RADIATOR SHIELD

BACKGROUND OF THE INVENTION

This invention relates generally to automobile accessories and more particularly concerns a shield for protecting the radiator of a motor vehicle.

The front grilles and radiators of motor vehicles are typically presently protected or shielded by optional or after-market devices which cover the outer surface of the grille. Some of these devices are intended to be primarily decorative, so their openings are contoured to coordinate with and enhance the appearance of the grille. While they may be aesthetically pleasing, their openings are too large to prevent stones and other highway debris from passing through the grille and striking the face of the radiator. Others of these devices are intended to be primarily protective of the grille and radiator. While they may block stones and other debris from passing through the grille, their openings, if any, are generally too small or incorrectly shaped to permit a sufficient flow of air to the radiator. All of these devices cover the grille, and even the most aesthetically pleasing of them detract from the beauty of the vehicle'grille as it appeared to the purchaser at the time of purchase. Their exposed covers are easily pierced, torn or otherwise damaged and, despite being accessible from the exterior, they are inconvenient to remove and clean.

It is, therefore, an object of this invention to provide a motor vehicle radiator shield which does not cover the external details of the vehicle. Another object of this invention is to provide a motor vehicle radiator shield which is mounted between the vehicle front grille and radiator. A further object of this invention is to provide a motor vehicle radiator shield which is mountable on the vehicle frame rather than on the vehicle grille. Yet another object of this invention is to provide a motor vehicle radiator shield which is easily removable from the vehicle for replacement or cleaning. It is also an object of this invention to provide a motor vehicle radiator shield which has openings small enough to effectively reduce occurrences of stones and debris striking the face of the radiator. Still another object of this invention is to provide a motor vehicle radiator shield with a percentage of open surface area sufficient to permit air to flow to the radiator at a rate useful to cool the radiator. An additional object of this invention is to provide a motor vehicle radiator shield which has openings which are contoured to increase the velocity of air flow to the radiator. Another object of this invention is to provide a motor vehicle radiator shield which is durably constructed.

SUMMARY OF THE INVENTION

In accordance with the invention, a shield for protecting a radiator mounted behind the front grille of a motor vehicle has a grating vertically disposed between the grille and the radiator. A plurality of couplings has first and second mating members. The first members are mounted on the frame of the vehicle in a vertically planar pattern forward of the radiator. The second members are contoured to engage downwardly on and be supported by the first member. The second members are secured to the grating in a pattern horizontally coincident with the first members of the vertically planar pattern. Thus, the second members can be engaged on the first members to secure the shield in place between the vehicle grille and radiator.

Preferably, the grating has a matrix of quadrangular openings tapering from front to rear in the shape of a truncated pyramid. The increase of open area in the front face of the grating and the tapered walls of the openings maximize the rate of flow of air to the radiator. The small openings on the rear face of the grating reduce the possibility of stones and debris passing through the grating to the radiator.

To secure the second members to the grating, plugs contoured to be seated in the grating openings are dispersed in selected openings in the grating. In one embodiment, the second members may be clips secured to the plugs with the grating clamped therebetween by threaded engagement of shafts on the clips into holes in their respective plugs. The first members may take the form of tap screws with flanges projecting from their shanks for abutment against the frame of the vehicle. The clips have bodies with open-bottomed receptacles of T-shaped cross-section to receive the heads and shanks of the tap screws therein. In another embodiment, the buttons and clips may be interchanged so that the clips are the first members mounted to the vehicle frame and the buttons are the second members mounted on the gratings. In this embodiment, the clips will be open-topped to downwardly receive the buttons.

In a modified embodiment of the clips, mechanisms are also provided for locking the buttons in the clip receptacles. The locking mechanisms may, for example, be detents on leaf springs which are fastened to the clips. Indentations in the buttons engage with the detents to prevent the buttons from inadvertently separating from the clips. Mechanisms may also be provided on the clips to facilitate the user bending the leaf springs against bias to withdraw the detents from the indentations and permit disengagement of the buttons and the clips to detach the shield from the vehicle frame.

BRIEF DESCRIPTION OF THE DRAWINGS

Other objects and advantages of the invention will become apparent upon reading the following detailed description and upon reference to the drawings in which:

FIG. 1 is a side elevation view illustrating the radiator shield mounted between the vehicle grille and radiator, FIG. 2 is a perspective view of a preferred embodiment of the grating of the radiator shield;

FIG. 9 is a side elevation view of the buttons of the radiator shield;

FIG. 10 is a rear elevation view of the buttons of FIG. 9;

FIG. 11 is a cross-sectional view taken in a vertical diametric plane of a first embodiment of the shield mounted to the vehicle frame;

FIG. 12 is a cross-sectional view taken in a vertical diametric plane of a second embodiment of the shield mounted to the vehicle frame;

FIG. 13 is a cross-sectional view taken in a vertical diametric plane of modified clips of the radiator shield; and FIG. 14 is a top plan view of the modified clips of FIG. 13.

Figure 3:
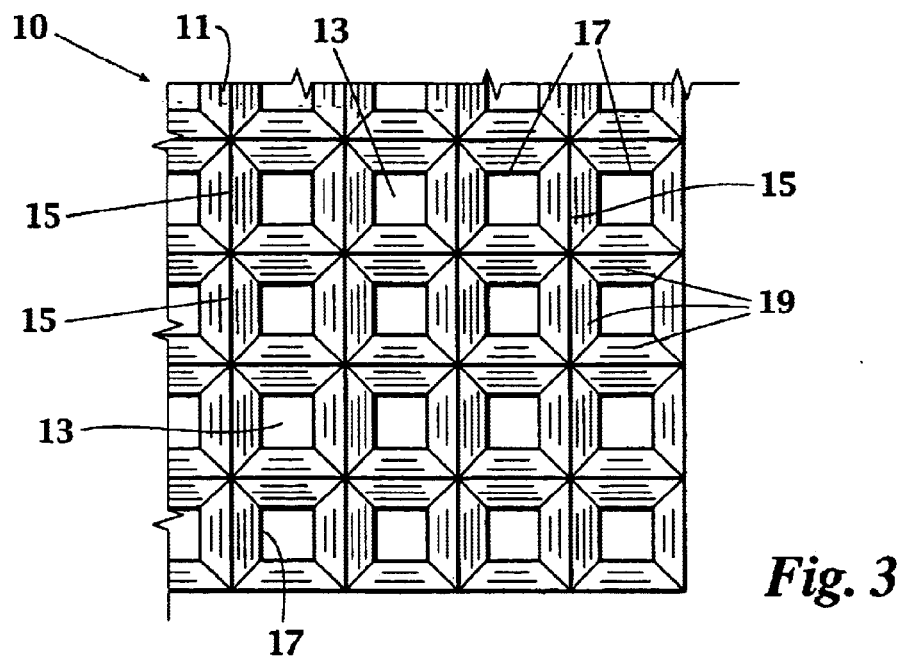
FIG. 3 is a rear elevation view of the grating of FIG. 2.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

Turning first to FIG. 1, a motor vehicle radiator shield S is illustrated in its mounted orientation between the front grille G and the radiator R of the motor vehicle. The shield S consists of a grating 10 attached to selected portions of the motor vehicle frame F by a plurality of couplings 30. Each coupling 30 consists of a first member 31 which is fixed to the vehicle frame F and a second member 33 which is attached to the grating 10. As shown, the first members 31 are secured to portions of the vehicle frame F forward of the radiator R which are selected so that the first members 31 will lie in a common vertical plane 35. In some instances, it may be desirable to add spacing members (not shown) to the existing frame if an insufficient number of common plane locations are not already available on the frame. The second members 33 of the couplings 30 are attached to the grating 10 in a pattern having axes 37 which are horizontally coincident with the first members 31. Thus, by engaging the first and second members 31 and 33 of each of the couplings 30, the grating 10 may be fixed in a vertical orientation in front of the radiator R and behind the grille G. As shown, the grating 10 should be spaced forward of the radiator R so that, if the grating 10 should become clogged by ice or debris, the face of the radiator R will still be exposed to air flow.

Turning now to FIGS. 2 and 3, a preferred embodiment of the grating 10 is illustrated. The grating 10 consists of a matrix 11 of openings 13 which permit air to pass from the grille G through the shield S to the radiator R of the vehicle. As shown, the passages 13 have large front face openings 15 and smaller rear face openings 17 connected by tapered walls 19. Preferably, the openings 15 and 17 are quadrangular so that the tapered walls 19 form passages 13 in the shape of truncated pyramids. This quadrangular configuration is preferred because it affords the maximum possibility for open area through the grating 10, resulting in greater air flow to the radiator R. As shown, the front face openings 15 have abutting edges, resulting in a totally open front face on the grating 10. However, the edges need not abut and any shape of opening could be used, such as triangular, circular or ovate, as long as not less than approximately fifty-nine percent of the front face area is open. The tapering size of the passages 13 increases the velocity of air flow to the radiator R. The angle of taper 21 seen in FIGS. 11 and 12 is approximately thirty degrees. However, any angle of taper 19 can be used provided that the shortest distance across the rear face openings is not more than approximately 3/16 inch and the strength of the grating 10 is not compromised. If the percentage of open area is less than fifty-nine percent, the air flow to the radiator R will be less than desirable. If the shortest distance across the openings is more than approximately 3/16 inch, the filtering capability of the grating 10 will be greatly diminished. A matrix made of plastic having a thickness of 0.21 inches with square rectangular front openings spaced at 1/8 inch from each other and tapering at a one degree angle 39 to square rear face openings 17 with sides 3/16 inches long is suitable.

Figure 4:
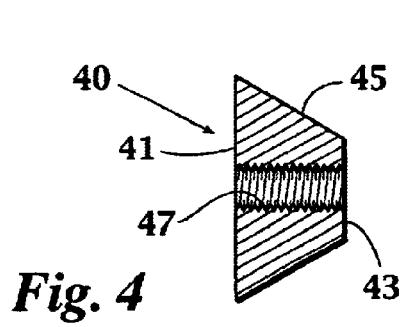
FIG. 4 is a side elevation view of the plugs of the radiator shield.
Figure 5:
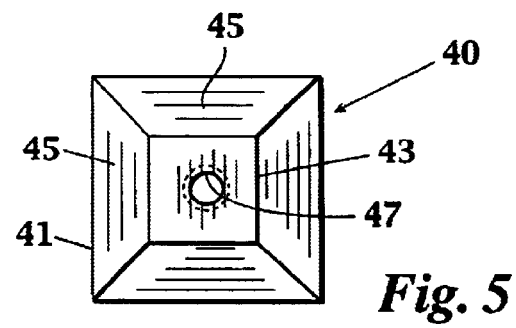
FIG. 5 is a rear elevation view of the plugs of FIG. 4.

In FIGS. 4 and 5, a preferred embodiment of a plug 40 for use with the grating 10 illustrated in FIGS. 2 and 3 is seen. The plug 40 is sized and shaped to be seated in and fill a passage 13 through the grating 10. Thus, for use with the grating 10 shown, the plug 40 takes the shape of a frustro-quadralateral pyramid having a front wall 41 matching the shape of the front face openings 15 of the grating 10, a rear wall 43 shaped like the rear face openings 17 of the grating 10 and tapered sidewalls 45 contoured to be seated against the tapered walls 19 of the passages 13 through the grating 10. The plugs 10 are also provided with a threaded hole 47, as shown extending through the depth of the plug 10 at its axial center.

Figure 6:
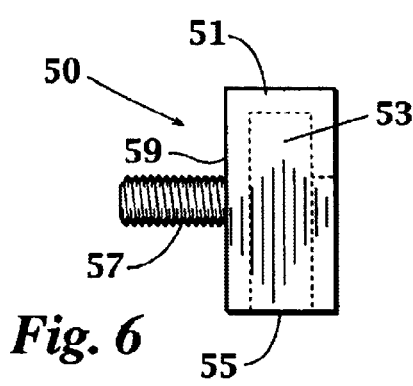
FIG. 6 is a side elevation view of the clips of the radiator shield.
Figure 7:
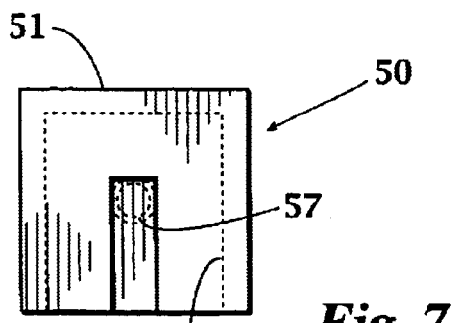
FIG. 7 is a rear elevation view of the clips of FIG. 6.
Figure 8:
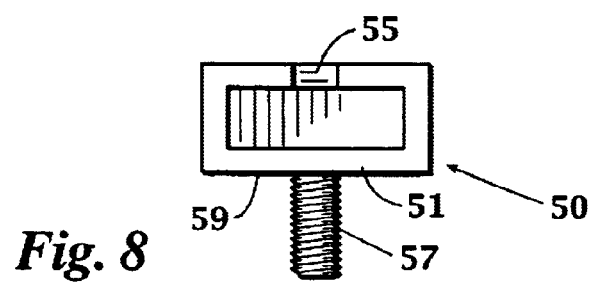
FIG. 8 is a bottom plan view of the clips of FIG. 6.

A preferred embodiment of the clips 50 which can, with slight modifications hereinafter explained, be used as either the first or second members 31 and 33 of the couplings 30 illustrated in FIG. 1 is shown in FIGS. 6, 7 and 8. Each clip 50 consists of a body 51 defining a receptacle 53 having a T-shaped cross-section 55. A threaded shaft 57 extends outwardly from the receptacle wall 59 opposite the supporting leg of the T-shaped cross-section 55.

Turning now to FIGS. 9 and 10, a preferred embodiment of the buttons 60 for use with the clips 50 is illustrated. The buttons 60 may, with slight modifications hereinafter explained, be used as a second or first member 33 or 31 of the coupling 30. As shown, the buttons 60 may each consist of a tap screw 61 having a shank 63 extending to a head 65. An annular flange 67 about the shank 63 defines an annular recess 69 between the shank 63 and the head 65.

Turning now to FIG. 11, a first embodiment of the coupling 30 in which a clip 50 is used as the second member 33 of the coupling 30 and the button 60 is used as the first member of the coupling 30 is illustrated. The plug 40 is inserted into a passageway 13 in the grating 10 and the threaded shaft 57 of the clip 50 is engaged in the threaded hole 47 of the plug 40 until the clip 50 is firmly engaged against the grating 10 with the T-shaped opening 55 in the clip 50 at the bottom of the clip 50. The tap screw 61 of the button 60 is threaded into the motor vehicle frame F until the button flange 67 is firmly abutted against the motor vehicle frame F. The clip 50 can thus be downwardly engaged on the button 60 with the head 65 of the button 60 sliding into the cross portion of the T-shaped cross-section 55 of the receptacle 53 and the shank 63 of the button 60 sliding into the leg of the T-shaped cross-section 55 of the receptacle 53. Thus, the button 60 supports the clip 50 and the grating 10 from the motor vehicle frame F.

Another embodiment of the coupling 30 is illustrated in FIG. 12. In this embodiment, the roles of the clip 50 and the button 60 are interchanged. Therefore, opposite to the embodiment of FIG. 11, the button 60 has a threaded shaft 68 and the clip 50 has a tap screw 52. The button 60 has its threaded shaft 68 engaged in the plug 40 and the clip 50 has its tap screw 52 threaded into the motor vehicle frame F. In this embodiment, the clip 50 is drawn tightly against the motor vehicle frame F with the open end of the receptacle 53 at the top so that the button 60 can be downwardly engaged in the clip 50. Thus, the clip 50 secured to the motor vehicle frame F supports the button 60 secured to the grating 10.

To mount the grating 10 to the motor vehicle frame, the grating 10 is first inserted between the grille G and the radiator R in its desired vertical condition. Appropriate points on the frame F in substantially a common plane and within the perimeter of the grating 10 are identified. Three, four or five such points dispersed across the grating 10 are sufficient, though more could be used. If a sufficient number of coplanar locations are identified, they are marked to receive the first members 31 of the couplings 30. If an insufficient number are available, spacers (not shown) can be used to extend the vehicle frame F into coplanar locations. The horizontally axially corresponding passages 13 through the grating 10 are then seated with plugs 40 and the second members 33 of the couplings 30 are threadedly engaged in the plugs. The first members 31 of the couplings 30 are screwed into the motor vehicle frame F at the identified locations. The clips 50 and buttons 60 are tightened to their relative position using the tap screws 61 or 52 and threaded shafts 57 or 68 as described in relation to FIGS. 11 and 12. The second members 33 can then be downwardly engaged on the first members 31 of the couplings 30 to secure the grating 10 in vertical position in front of the radiator R.

Turning now to FIGS. 13 and 14, a modified clip 70 and button 90 are usable to lock the grating 10 in place. The modified clip 70 is similar to the previously described clip 50 except that the depth of the receptacle 71 is greater than the depth of the head 65 of the button 60. The increased depth affords space for a leaf spring 73 which is secured to the clip 70, as shown by a screw 75. The free end of the leaf spring 73 has a detent 77 which is aligned and cooperable with an indentation 99 provided in the head 95 of the modified button 90. The leaf spring 73 is shaped so that, in its normal state, the detent 77 is engaged in the indentation 99 to lock the button 90 in place in the clip 70. A retractor 81 is slidable by the user between the leaf spring 73 and the head 95 of the button 90 to bend the leaf spring 73 against bias and withdraw the detent 77 from the indentation 99. The retractor 81 may slide up and down in grooves 83 in the clip 70. If it is desirable to lock the grating 10 in place, the modified clip 70 and button 90 may be used in place of one or more of the clips 50 and buttons 60.

Thus, it is apparent that there has been provided, in accordance with the invention, a motor vehicle radiator shield that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For protecting a radiator mounted behind the front grille of a motor vehicle, a shield comprising a grating for vertical disposition between the grille and the radiator, a plurality of couplings, each said coupling comprising a first member adapted to be mounted on a frame of the vehicle in a vertically planar pattern forward of the radiator and a second member contoured to engage downwardly on and be supported by said first member, and a plurality of means for securing said second members to said grating in a pattern horizontally coincident with said first members of said vertically planar pattern.

2. For protecting a radiator mounted behind the front grille of a motor vehicle, a shield comprising a grating for vertical disposition between the grille and the radiator, said grating having a matrix of openings tapering from front to rear thereof, a plurality of couplings, each said coupling comprising a first member adapted to be mounted on a frame of the vehicle in a vertically planar pattern forward of the radiator and a second member contoured to engage downwardly on and be supported by said first member, and a plurality of means for securing said second members to said grating in a pattern horizontally coincident with said first members of said vertically planar pattern.

3. For protecting a radiator mounted behind the front grille of a motor vehicle, a shield comprising a grating for vertical disposition between the grille and the radiator, said grating having a matrix of openings tapering from front to rear thereof, a plurality of buttons adapted to be mounted on a frame of the vehicle in a vertically planar pattern forward of the radiator, a plurality of clips, each being contoured to engage downwardly on and be supported by one of said buttons, a plurality of plugs, each being contoured to be seated in one of said openings, said plurality of plugs being dispersed in said grating, and a plurality of means for securing said clips to said plugs with said grating clamped therebetween.

4. A shield according to claim 3, said openings being quadrangular.

5. A shield according to claim 4, said openings having the shape of a truncated pyramid.

6. A shield according to claim 3, each said securing means comprising a shaft on each said clip threadedly engaged in a hole in its respective said plug.

7. A shield according to claim 3, each said button comprising a tap screw having a flange projecting from a shank thereof.

8. A shield according to claim 7, each said clip comprising a body having an open-bottomed receptacle of T-shaped cross-section for receiving a head and said shank of said tap screw therein.

9. A shield according to claim 8, said securing means comprising a shaft on each said body threadedly engaged in a hole in its respective said plug.

10. A shield according to claim 8, at least one of said clips further comprising means for locking said button in said receptacle.

11. A shield according to claim 10, said locking means comprising a detent on a leaf spring fastened to said clip, an indentation in said button for engagement with said detent and a mechanism on said clip for bending said leaf spring against bias to permit withdrawal of said detent from said indentation.

12. For protecting a radiator mounted behind the front grille of a motor vehicle, a shield comprising a grating for vertical disposition between the grille and the radiator, said grating having a matrix of openings tapering from front to rear thereof, a plurality of clips adapted to be mounted on a frame of the vehicle in a vertically planar pattern forward of the radiator, a plurality of buttons, each being contoured to engage downwardly on and be supported by one of said clips, a plurality of plugs, each being contoured to be seated in one of said openings, said plurality of plugs being dispersed in said grating, and a plurality of means for securing said buttons to said plugs with said grating clamped therebetween.

13. A shield according to claim 12, said openings being quadrangular.

14. A shield according to claim 13, said openings having the shape of a truncated pyramid.

15. A shield according to claim 12, each said securing means comprising a shaft on each said button threadedly engaged in a hole in its respective said plug.

16. A shield according to claim 15, each said button further comprising an annular flange on said shaft and a shank extending from said flange to a head of said button.

17. A shield according to claim 16, each said clip comprising a body having an open-topped receptacle of T-shaped cross-section for receiving a head and said shank of said button therein.

18. A shield according to claim 17, said securing means comprising a shaft on each said body threadedly engaged in a hole in its respective said plug.

19. A shield according to claim 17, at least one of said clips further comprising means or locking said button in said receptacle.

20. A shield according to claim 19, said locking means comprising a detent on a leaf spring fastened to said clip, an indentation in said button for engagement with said detent and a mechanism on said clip for bending said leaf spring against bias to permit withdrawal of said detent from said indentation.

* * * * *